US010809399B2

United States Patent
Abma et al.

(10) Patent No.: US 10,809,399 B2
(45) Date of Patent: Oct. 20, 2020

(54) INDEPENDENT SIMULTANEOUS SHOOTING ACQUISITION WITH VERTICAL SEISMIC PROFILE RECORDING

(71) Applicant: BP Corporation North America Inc., Houston, TX (US)

(72) Inventors: Raymond Lee Abma, Naperville, IL (US); Brian Hornby, Naperville, IL (US); David John Howe, Naperville, IL (US); John Naranjo, Naperville, IL (US); Min Zhou, Naperville, IL (US)

(73) Assignee: BP Corporation North America Inc., Houston, TX (US)

( * ) Notice: Subject to any disclaimer, the term of this patent is extended or adjusted under 35 U.S.C. 154(b) by 0 days.

(21) Appl. No.: 14/869,059

(22) Filed: Sep. 29, 2015

(65) Prior Publication Data

US 2016/0018540 A1  Jan. 21, 2016

Related U.S. Application Data

(63) Continuation-in-part of application No. 13/867,705, filed on Apr. 22, 2013, now Pat. No. 9,310,498, and a continuation of application No. 12/310,204, filed on Feb. 17, 2009, now abandoned.

(60) Provisional application No. 62/057,320, filed on Sep. 30, 2014.

(51) Int. Cl.
| | |
|---|---|
| *G01V 1/28* | (2006.01) |
| *G01V 1/38* | (2006.01) |
| *G01V 1/42* | (2006.01) |
| *G01V 1/00* | (2006.01) |

(52) U.S. Cl.
CPC ............... *G01V 1/28* (2013.01); *G01V 1/003* (2013.01); *G01V 1/005* (2013.01); *G01V 1/3808* (2013.01); *G01V 1/42* (2013.01); *G01V 2210/1293* (2013.01); *G01V 2210/1299* (2013.01); *G01V 2210/161* (2013.01)

(58) Field of Classification Search
CPC ........ G01V 1/28; G01V 1/3808; G01V 1/005; G01V 1/003; G01V 2210/1293; G01V 2210/161; G01V 2210/1299
USPC ...................................................... 367/21, 57
See application file for complete search history.

(56) References Cited

U.S. PATENT DOCUMENTS

| | | | |
|---|---|---|---|
| 9,091,788 B2* | 7/2015 | Trad ....................... | G01V 1/364 |
| 9,164,185 B2* | 10/2015 | Coste ..................... | G01V 1/005 |
| 2010/0039894 A1* | 2/2010 | Abma .................... | G01V 1/005 367/52 |
| 2010/0299070 A1* | 11/2010 | Abma .................... | G01V 1/005 702/14 |
| 2011/0013482 A1* | 1/2011 | Eick ....................... | G01V 1/003 367/38 |

(Continued)

OTHER PUBLICATIONS

PCT Search Report dated Feb. 2, 2016.

*Primary Examiner* — Daniel L Murphy
(74) *Attorney, Agent, or Firm* — Robert Hsiao (57) ABSTRACT

A method for use in vertical seismic profiling includes: independently and simultaneously shooting a plurality of seismic sources in a plurality of shooting areas to impart seismic signals into a water bottom: receiving reflections of the seismic signals from a subterranean formation beneath the water bottom at a plurality of seismic receivers; and recording the received reflections; wherein, one of the seismic sources and the seismic receivers are disposed in a wellbore in the water bottom.

19 Claims, 5 Drawing Sheets

(56) References Cited

U.S. PATENT DOCUMENTS

2011/0272147 A1 11/2011 Beasley
2012/0008459 A1 1/2012 Coste et al.
2012/0033525 A1 2/2012 Abma
2012/0147701 A1 6/2012 Ross

* cited by examiner

INDEPENDENT SIMULTANEOUS SHOOTING ACQUISITION WITH VERTICAL SEISMIC PROFILE RECORDING

DESCRIPTION OF THE INVENTION

This application claims domestic priority, under 35 U.S.C. § 119(e), of Provisional Application No. 62/057,320, filed Sep. 30, 2014. This application is also a continuation-in-part of co-pending U.S. application Ser. No. 13/867,705, entitled "Seismic Survey Method", and filed Apr. 22, 2013, in the name of David John Howe, which is a continuation of U.S. application Ser. No. 12/310,204, entitled, "Seismic Survey Method", and filed Aug. 30, 2007, in the name of David John Howe, now abandoned. All applications are commonly assigned herewith and are hereby incorporated by reference for all purposes as if set forth verbatim herein.

FIELD OF THE INVENTION

The presently disclosed technique pertains to vertical seismic profiling in seismic exploration and, more particularly, to acquisition and processing of vertical seismic profiling data.

BACKGROUND OF THE INVENTION

Seismic exploration, sometimes also called geophysical exploration, is the art of indirectly discerning the structure, composition, and content of subterranean formations. This typically involves imparting acoustic signals having particular characteristics into the earth. The particular characteristics tailor the acoustic signals for this purpose because not all acoustic signals are suitable. These tailored acoustic signals are therefore typically called seismic signals. Various features in the subterranean formation(s) will reflect the seismic signals which are then recorded on the earth's surface, on the seabed, or in a well or wells penetrating the subterranean formations. The recorded reflections can then be analyzed to glean information about the subterranean formation.

The process of imparting acoustic signals and recording their reflections is frequently referred to as "seismic surveying" and there are innumerable variations across the art. For example, there are one-dimensional ("1D"), two-dimensional ("2D"), three-dimensional ("3D"), and four-dimensional ("4D") surveys, depending on the spatial and temporal distribution of the coverage. Similarly, there are land-based, marine, and transition zone surveys depending upon whether the survey is conducted on land, in the water, or in the transition between land and water (such as tidal areas, marshes, bogs, swamps, etc.).

These variations frequently manifest in significant technological differences. For example, in a land-based survey, the energy of a seismic signal travels both as shear waves and as pressure waves. However, because of the differences between earth and water, the energy will only travel as pressure waves in water. Land-based surveys consequently record different information than do surveys conducted in or over water. Land-based surveys therefore use different kinds of sensors in their receivers than do marine surveys. To the extent that marine surveys might use the same kinds of sensors as do land-based surveys, they use them to detect the direction of travel for pressure waves rather than the detection of shear waves. Technologies and techniques for various types of surveys therefore are not necessarily transferable amongst those various types of seismic surveys.

One kind of seismic survey is a borehole seismic survey. This seismic survey has seismic sensors in a well or wells penetrating the subsurface. This survey is typically used to clarify or further an understanding of a subterranean formation's characteristics in the immediate area of the wellbore rather than across a wide area. A particular sort of borehole seismic survey is known as a "vertical seismic profile", or "VSP", survey. A VSP survey is distinguishable from most other seismic survey types in several ways. Perhaps the most striking is that the receivers are disposed "vertically" in a wellbore rather than "horizontally" on the surface of the ground or water.

3D VSP seismic surveys have found utility within the industry and so have continued to receive attention from the art. Numerous techniques tor use in 3D VSP seismic surveys have been developed. Many of these have been shown to be quite competent for their intended purposes. The art however is always receptive to improvements or alternative means, methods and configurations. Therefore the art will well receive the technique described herein.

BRIEF DESCRIPTION OF THE DRAWINGS

The accompanying drawings, which are incorporated in and constitute a part of this specification, illustrate embodiments of the invention and together with the description, serve to explain the principles of the invention. In the figures:

FIG. 2A-2C Illustrate the acquisition in the survey of FIG. 1 wherein

DESCRIPTION OF THE EMBODIMENTS

Reference will now be made in detail to the present embodiment(s) (exemplary embodiments) of the invention, an example(s) of which is (are) illustrated in the accompanying drawings. Wherever possible, the same reference numbers will be used throughout the drawings to refer to the same or like parts.

Figure 1:
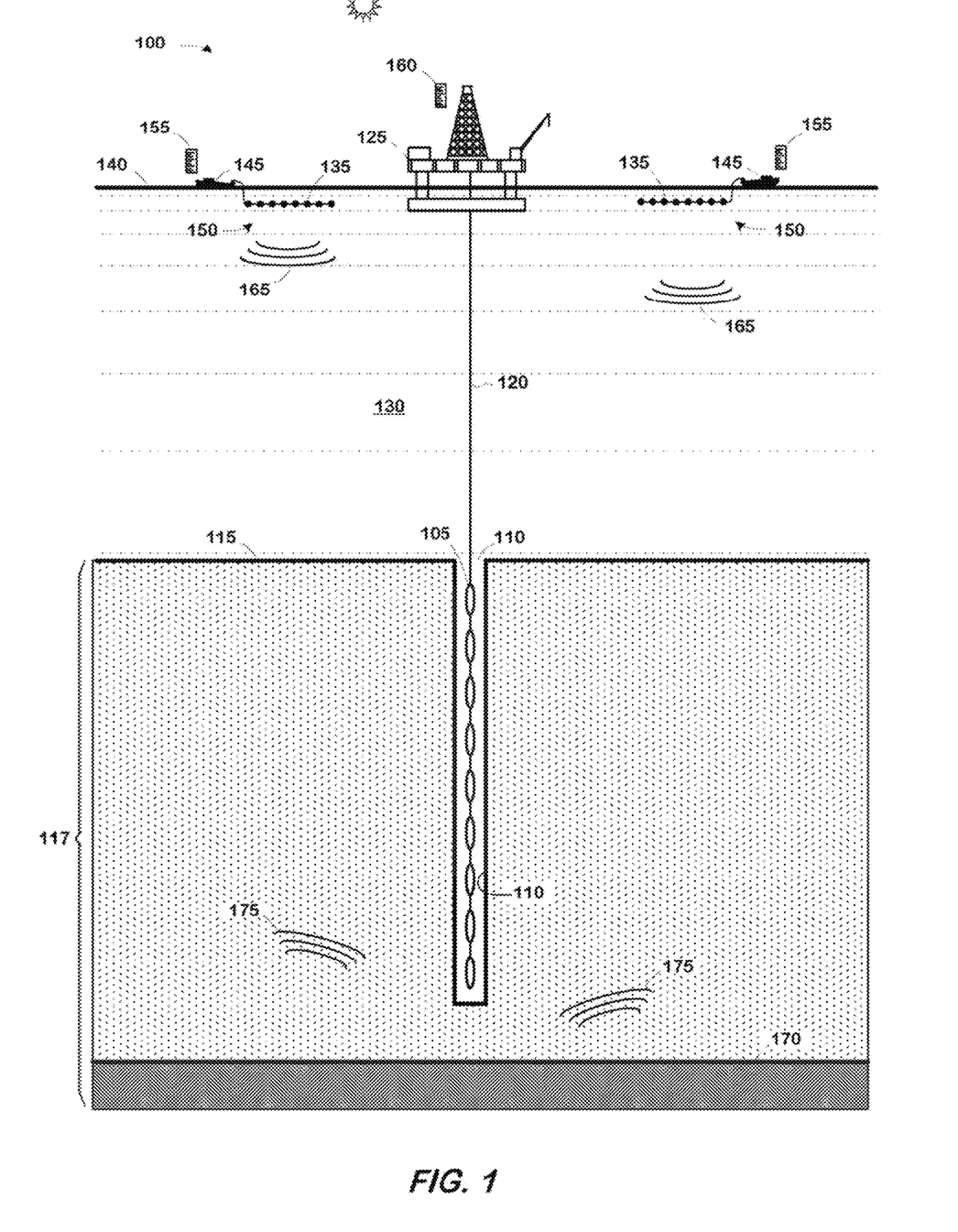
FIG. 1 depicts one particular embodiment of a marine VSP seismic survey in accordance with one aspect of the presently disclosed technique.

FIG. 1 depicts one particular embodiment of an apparatus for a VSP seismic survey 100 in accordance with one aspect of the presently disclosed technique. The apparatus generally comprises, on the receiver side, a plurality of seismic receivers 105 (only one indicated) disposed in a wellbore 110 drilled through the water bottom 115 and into the subterranean formation 117. The seismic receivers 105 are suspended on a wireline 120 from the rig 125 into the subterranean formation 117.

The VSP seismic survey 100 is a marine VSP seismic survey because it occurs in a "marine" environment. As those in the art will appreciate, the term "marine" does not necessarily imply that the water in the water column 130 is saltwater. It also encompasses fresh waters and brackish waters. Thus, although the water in the embodiment of FIG. 1 is indeed saltwater, it may be fresh or brackish water in alternative embodiments. However, the term "marine" does distinguish the illustrated seismic survey from, for example, land-based and transition zone VSP seismic surveys. In an embodiment, the VSP survey uses three dimensional (3D) imaging using an array of borehole receivers and a two dimensional (2D) surface grid of seismic source positions, which is referred to as a 3D VSP survey. Accordingly, in embodiments, the survey may be a 2D or 3D VSP survey, but the description below will refer a 3D VSP survey.

The rig 125 may be any type of rig known to the art depending upon well-known considerations such as cost, location, availability, and depth of operation. The industry currently employs a wide variety of rigs such as drillships, semisubmersibles, jackups, and submersibles depending on these kinds of factors. The rig 125 of the illustrated invention is a semisubmersible, but the type of rig is immaterial to the practice of the presently disclosed technique. Alternative embodiments may employ any one of a drillship, a jackup, a submersible, or some other type of rig known to the art for use in marine environments.

Those in the art will appreciate that many wells use a casing to support the integrity and structure of the walls of the wellbore. The wellbore 110 is shown without a casing, and therefore is what is known as "uncased". This is for ease of illustration and for the sake of clarity. The wellbore 110 will typically be cased in most embodiments. However, the presently disclosed technique is indifferent as to whether the wellbore 110 is cased or uncased. Still further, other embodiments may also include a plurality of wellbores 110 each having a plurality of sensors 105.

FIG. 1 has also been simplified by the omission of equipment at the subsea wellhead. Such equipment may include, for example, a drilling guide base; a low-pressure housing, a high-pressure wellhead housing, casing hangers, a metal-to-metal annulus sealing assembly, and bore protectors and wear bushings, depending on the implementation. Those in the art having the benefit of this disclosure will appreciate not only that such equipment will be present in implementation specific detail, but also how to interface it with the presently disclosed technique.

The wellbore 110 is shown extending vertically into the subterranean formation 117 in a strictly vertical direction. Those in the art having the benefit of this disclosure will appreciate that wellbores are frequently drilled in a manner by winch they deviate born the vertical. Sometimes the deviation can be quite significant. It is well known in the art can be performed in wellbores that deviate from the vertical in this manner and so the presently disclosed technique is not limited to use in wellbores that extend vertically without deviation.

The seismic receivers 105 are, in this embodiment, receivers. 3D VSP techniques theoretically contemplate that the sensors disposed within the wellbore may be sources rather than receivers. This is rarely the case, however, because of fears that operation of sources may damage the integrity of the wellbore. In the illustrated embodiment, each receiver comprises three geophones—one for each of the x, y, and z axes in a Cartesian coordinate system—and a pressure wave sensor for use in p-z summation. Alternative embodiments may use different configurations of geophones, hydrophones (pressure wave sensors), or both. Additional embodiments of the receivers include, but are not limited to, fiber optics, MEMS, accelerometers, rotation sensors, or any combination of the receivers listed above.

Still referring to FIG. 1, on the source side, the apparatus comprises a plurality of seismic sources 135 (only two indicated) towed on the water's surface 140 by a plurality of tow vessels 145. The sources may be of any type known to the art. In the illustrated embodiment, the seismic sources 135 are a kind of source known to the art as impulse sources. Or, more specifically, the seismic sources 135 are airguns. However, other embodiments may use other kinds of sources. For example, some embodiments may use non-impulse sources such as swept seismic sources.

Those in the art will appreciate that airguns are typically deployed in arrays rather than singly. This is the case in the illustrated embodiment. Each of the seismic sources 135 is deployed in an array 150 of like seismic sources 135. The number of airguns—i.e., seismic sources 135—in the arrays will be an implementation specific detail dependent upon factors well known to those in the art. The arrays 150 are shown as comprising eight airguns, but this is for illustration only.

Figure 2A:
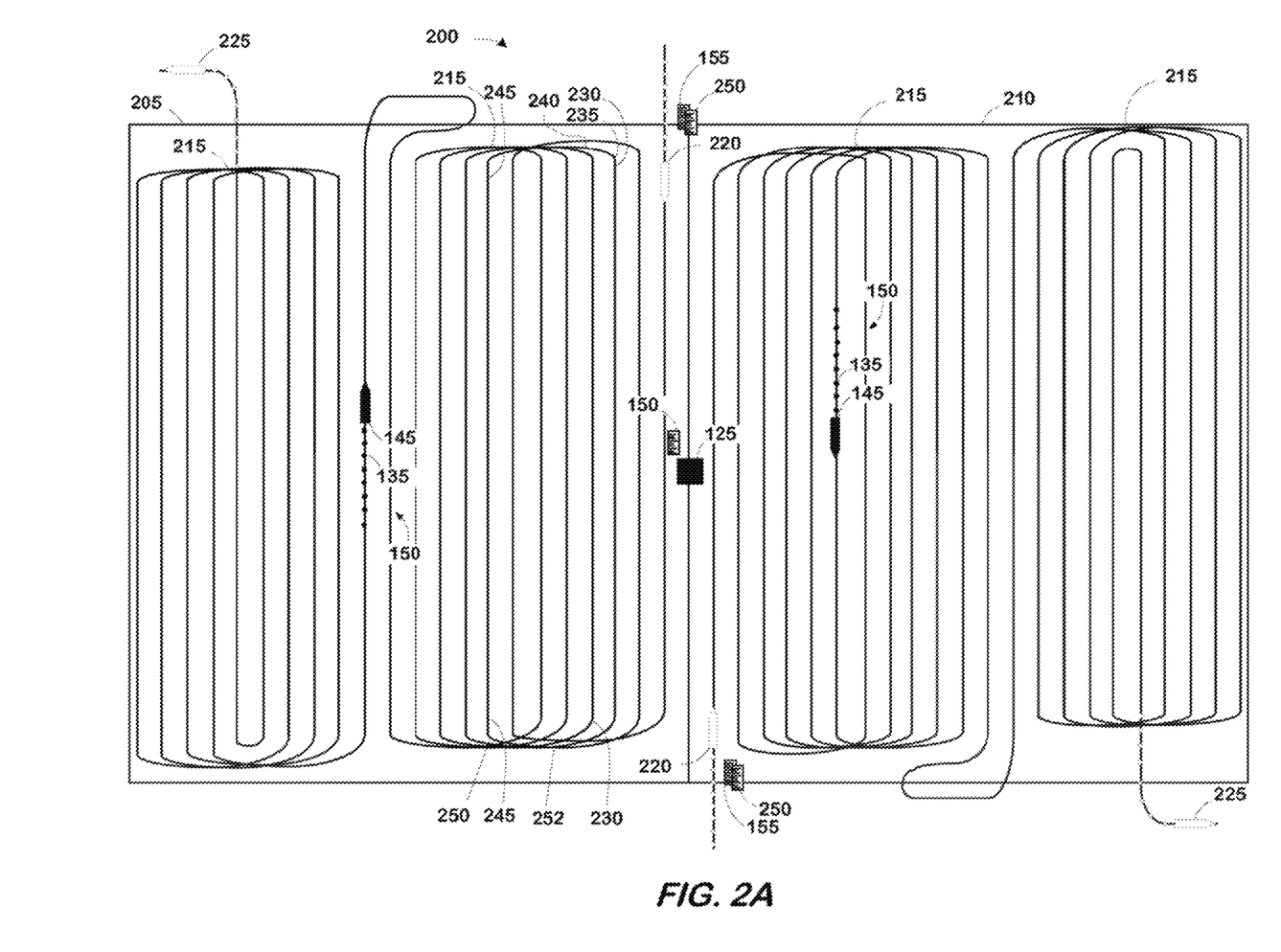
FIG. 2A is a bird's-eye view of the apparatus and the sail lines and FIG. 2B-FIG. 2C depict alternative firing patterns.

The illustrated embodiment employs two tow vessels 145. As shown in FIG. 2A, the survey area 200 is divided into two shooting areas 205, 210. In the illustrated embodiment, the two shooting areas 205, 210 are equal halves of the survey area 200. Alternative embodiments may apportion the two shooting areas 205, 210 unequally. The depiction in FIG. 2A is also idealized in other ways. For example, the survey area 200 need not be a regular geometric shape and may be much larger relative to the tow vessels 145 and the rig 125.

The presently disclosed technique uses at least two seismic sources 135 in two shooting areas 205, 210 at the surface 140 and, hence, two tow vessels 145. Alternative embodiments may use of other numbers, for example three or four seismic sources (or arrays) in three or four shooting areas. In theory, there is no limit as to the number of shooting areas, tow vessels 145, and seismic sources 135 or arrays 150 thereof in any given embodiment. Economic considerations will nevertheless limit these numbers as a practical matter.

The marine seismic survey 100 is conducted in accordance with a predetermined survey design with which each of the tow vessels 145 and the rig 125 are provided with relevant portions. Each of the two vessels 145 and the rig 125 is equipped with a computing apparatus (not shown) into which this information is loaded and stored. For the tow vessels 145, this information is the sail plan 155 and for the rig 125 it is the recording plan 160.

The conduct of marine 3D VSP seismic survey 100 departs from conventional practice at least in the aspect that it employs independent simultaneous shooting of the sources—i.e., the seismic sources 135 in the illustrated embodiment. This may be referred to as "independent simultaneous sourcing". As used herein, "independent simultaneous sourcing" may refer to multiple or a plurality of seismic sources or source arrays divided into at least two groups. The sources of each group are_activated "independently", that is, with no or very little coordination with the firing of seismic sources in other group(s). The seismic sources of these groups, while being fired independently, are also fired "simultaneously", or within the same firing window, as the seismic sources of the other group(s). In the illustrated embodiment, each of the two vessels 145 tows its array 150 in a pattern in a manner both spatially and temporally independent of the other in accordance with their respective sail plans 155. Similarly, while navigating their sail lines 215, shown in FIG. 2A, the seismic sources are fired without regard to what is happening in the other shooting area of the survey.

The term "simultaneous" is used in the sense that the recorded information from the materially interfering shots overlap each other, not in the sense that the shots are fired at the same time. For example, a first source may fire at a first time and a second shot may fire at a second time, where at least a portion of the first source's initial firing pulse overlaps with the second source. Another common industry name for this shooting is 'blended shooting', which emphasizes that the shots simply interfere with each other.

Such independent, simultaneous source shooting introduces a degree of randomness into the seismic record. This is a desirable feature of this acquisition method. For example, it removes the need for coordinating the shooting amongst the sources as well as the locations of the sources when they shoot. This considerably eases operational constraints during the survey. Independent simultaneous source shooting is not altogether unknown to the seismic surveying arts, both land-based and marine. One example may be found in U.S. application Ser. No. 12/310,204, filed Aug. 30, 2007, in the name of David John Howe ("the '204 application").

The presently disclosed technique also differs from the '204 application in that it teaches the use of multiple vibroseis sources, each of which possesses a distinctive signature. In the presently disclosed technique it is desirable that each seismic source have the same signature. Differences in source signature may be tolerated if slight enough to correct during processing as described below. However, some embodiments may employ different sweeps amongst the seismic sources. And, as discussed below, the illustrated embodiments use impulse, rather than swept sources.

Another difference between the presently disclosed technique and conventional marine 3D VSP seismic surveys is continuous recording. In conventional practice, the shooting times and positions are known so that it can be predicted when the reflections will arrive at the receivers. Conventional practice therefore typically is to record during windows when it is expected that reflections will arrive. In the presently disclosed technique, the randomness of the independent simultaneous source shooting prohibits such knowledge a priori, and so the recording is continuous.

Returning now to FIG. 2A, the tow vessels 145 each tow their respective seismic sources 135 along the sail lines 215 independently of the other as set out in their sail plans 155. As mentioned above, those in the art will appreciate that the tow vessels 145 include computing resources. Among other tasks, they can implement the sail plan 155, including automatically navigating the sail lines 215 and shooting the sources. However, as those in the art will also appreciate, it is not uncommon to have to stop shooting with a tow vessel 145 or otherwise override the automatic navigation for a variety of reasons. One advantage to the independent simultaneous source shooting of the presently disclosed technique is that such a halt in the operation of one tow vessel 145 need not halt the other.

The start points 220 and the end points 225 for each tow vessel 145 on their respective sail lines 125 are shown in ghosted lines. The starting points, 220, end points 225, and the sail lines 215 can all be designed in accordance with conventional practice to achieve implementation specific coverage of the subterranean formation 117. The sail lines 215 of the illustrated embodiment are shaped as a "race track", or an extended oval with flattened ends. Alternative embodiments may use alternative shapes.

The most common embodiment creates a regular rectangular grid of shots within the area of interest while shooting curved paths between the lines in the regular grid of shots. The curved paths at the ends of the lines may or may not have active shots, but the "race track" configuration allows efficient shooting by minimizing the turn times while allowing for the need to have smooth turns to avoid tangling the airgun arrays or loss of lift from the paravanes which keep the airgun arrays positioned correctly.

Each tow vessel 145 advances along the leg 230, reaches the end 235, whereupon the tow vessel 145 embarks upon a leg 240 to reach a leg 245. The tow vessel 145 then traverse the leg 245 in the opposite direction from which it traversed the leg 230. At the end 250 of leg 240, the tow vessel 145 then traverses, at 252, to the beginning of the next leg 230. The process repeats until the last leg 245 has been traversed and the tow vessel 145 reaches the end point 225 is reached.

As the tow vessel 145 traverses the legs 230, 245, it shoots the seismic sources. This shooting is "random" relative to the shooting by the other tow vessel(s) 145 as is discussed above. In this context, that means that there is little or no coordination in the firing of the two groups of seismic sources. The firing of the seismic sources towed by one of the tow vessels 145 therefore need not be synchronized or coordinated with the firing of the seismic sources towed by the other tow vessel 145.

The firing within each group of seismic sources is not necessarily random within its own respective sail pattern 155. That is, within each group of seismic sources towed by a respective tow vessel 145, the firing pattern is planned so that each firing is coordinated with the firing of other seismic sources within the group. The seismic sources—i.e., the seismic source 135 in this embodiment, are fired sequentially every 5-10 seconds, on average. Note that alternative embodiments may employ different shooting patterns, particularly where different kinds of seismic sources are used.

There are generally three methods of insuring that shots from one set of sources are close to random compared to those of another source set. The first method is to have the shooting boats move at different speeds so that while the time interval between the shots are somewhat regular, the interval at which the interference repeats is so long that the interference appears random. A second method of ensuring randomness between two source boats is to make interval between the source points irregular. The third method makes the source point interval regular, but add a small (plus and minus 250 millisecond) random perturbation to the expected arrival times at each source position. While the irregularities in the speed of the boats typically makes the time between shots random enough to allow good separation in the processing stage, the additional imposed randomness ensures that all shots have at least some time randomness for when the natural randomness becomes insufficient. The combined randomness of the shots from the different boats assures significant randomness between the shot times of the interfering boats.

The two groups of seismic sources, while fired independently of one another, are also fired at the same time, or "simultaneously". More particularly, the two groups of seismic sources are fired within the same firing/recording window. This does not imply that individual seismic sources are fired simultaneously, or at the same time, although this may happen by coincidence. Instead, the seismic sources within each group are fired during the same time period without regard to the precise time of firing for the seismic sources in the other group. Another common industry name for this shooting is 'blended shooting', which emphasizes that the shots simply materially interfere with each other.

While this method of acquisition may be done using conventional airgun shooting, where all the airguns in an array are fired simultaneously, the illustrated embodiment uses a "popcorn" shooting technique such as the one disclosed in U.S. application Ser. No. 13/315,947, filed Dec. 9, 2011, in the name of Allan Ross and Raymond Lee Abma ("the '947 application"). This approach individually fires the seismic sources within a seismic source array over time to reduce the maximum output of an array. Patterned seismic shots may result in lower peak sound pressure levels than conventional marine airgun arrays while maintaining approximately the same energy.

In the illustrated embodiment, the airguns of the arrays 150 are of three different sizes. A variety of different airgun sizes are known to the art. Known sizes include, for example, 40, 70, 80, 100, 120, 140, 175, 200, 250, and 350 in$^3$. Some embodiments may employ arrays of uniformly sized airguns, or arrays of differently sized airguns. For present purposes, the sizes of the airguns shall be referred to as large, medium, and small, since there are three and the numerical values will be implementation specific.

The seismic sources are fired according to a firing plan 250, previously downloaded to the tow vessels 145, that defines a firing pattern for the sources. The firing pattern is a function of several factors such as the length of time from the firing of the first seismic source to the firing of the last seismic source, the order in which the sources will fire, the time intervals between the firings, and the amplitude desired of any of the individual patterned arrays. The particular values for these factors in any given embodiment will be implementation specific.

For example, the firing pattern length may range from about 1 second to about 4 seconds, or from about 0.5 seconds to about 2 seconds, or from about 3 seconds to about 10 seconds. The time interval between firings may range from about 50 milliseconds to about 500 milliseconds, or from about 150 milliseconds to about 250 milliseconds, or from about 250 milliseconds to about 1 second. The presently disclosed technique admits wide flexibility in these factors.

However, the length of time over which the shots are fired is a function of the maximum amplitude desired on each shot pattern signature and the desired shot resolution. A very short firing time length will yield single gun shots whose peak amplitudes tend to stack constructively and a maximum amplitude for the firing pattern that will not be much lower than a conventional airgun array. A long firing time pattern will yield reconstructed shots that are smeared in space due to vessel travel. The balance of these factors will be implementation specific and without the ability of those ordinarily skilled in the art having the benefit of this disclosure. The order of the guns firing and the timing between them may be used to isolate the largest guns in the pattern sequence to minimize the stacking of single gun outputs and preventing the amplitude of the pattern shot from being minimized.

The shooting for each array 150 will follow a respective firing pattern, one for each area 205, 210 in the illustrated embodiment. The firing patterns should be different so that the notches in the spectra of adjacent patterned shots do not overlap significantly. For example, at least one trace in a processing window should leave significant energy in the desired frequency band, where common widths of the processing window vary from 5 to 40 traces. What is significant energy will vary depending on the environment of the acquisition in a manner that will be apparent to those skilled in the art having the benefit of this disclosure. For data with little noise, having even 5 percent of the expected output will allow accurate reconstruction of the desired signal. For very noisy data, it may be necessary to have 50 percent of the expected output to accurately reconstruct the signal.

Enough patterns should be created so as to allow significant randomness in adjacent patterns. That is, sequential firing patterns may all be different from one another. Any number of firing patterns may be generated and used with the disclosed methods. This number may be limited by the number of sources in the array and also the constraints and parameters chosen for the firing patterns.

The sequencing of the guns in their firing in any individual source pattern is related to the notches in the spectra of the individual patterns. It is desirable that the notches in the spectra cover a wide range of different frequency ranges. Since the sequencing of the individual sources in any given pattern is an important factor in the maximum amplitude of any individual pattern, the firing time of each source should be carefully calculated and controlled.

Figure 2B:
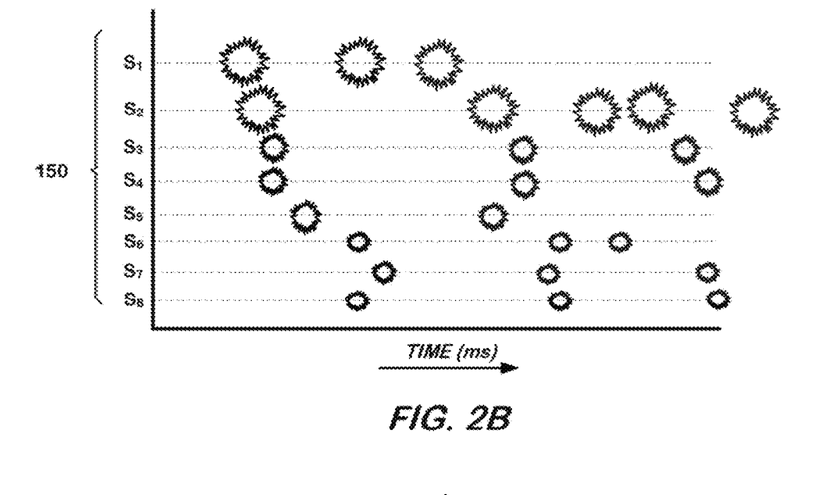
Figure 2C:
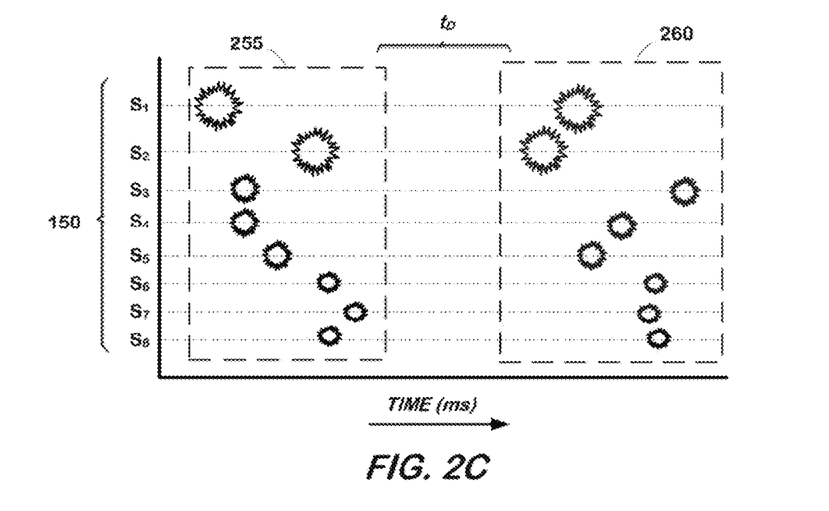

The illustrated embodiment may shoot in either a "continuous" mode, shown in FIG. 2B, or in a "time delay" mode, shown in FIG. 2C. The burst graphics in those drawings indicate a firing of the respective source $S_1$-$S_8$ and their relative sizes reflect the relative sizes of the sources.

The continuous shooting mode in FIG. 2B may also be referred to as "continuous patterned shooting" or "continuous firing patterns." The continuous shooting mode of FIG. 2B comprises a single shooting pattern 255. Turning to FIG. 2C, the time delay mode may also be referred to as "discrete patterned shooting" or "discrete firing patterns". Each source $S_1$-$S_8$ shoots two firing patterns 255, 260 that are temporally separated by a time delay $t_D$ The two faring patterns 255, 260 are different The two modes of shooting are primarily distinguished by the presence of the time delay $t_D$. One may consider the continuous mode of shooting to be the same as the time delayed mode with a time delay $t_D$=0. When patterned or sequenced shots are used with a continuously varying source pattern while moving along a snot line, the shots may be partitioned into reconstructed shots with either large or small spatial extent. The reconstructed shot spacing then be used as a processing parameter.

Returning now to FIG. 1, the imparted seismic signals 165 travel through the water column 130, encounter the water bottom 115, and continue propagating to the reflector 170, which reflects a portion of the seismic signals 165. Those in the art will appreciate that this description and portrayal are idealized for purposes of disclosure. For example, the water bottom 115 is also a reflector, but the reflections (not shown) are of little interest because they contain no information about the subterranean formation 117. Furthermore, any formation of interest will usually include a multitude of reflectors and the reflectors will be much more complex than what is shown. These types of details will be readily appreciated by those skilled in the art having the benefit of this disclosure.

While the seismic sources are shooting, the seismic receivers 105 are detecting the reflections 175. The receivers digitize the received reflections 175 for digital recording. There are many approaches to the recording and collection of the resultant data. In the illustrated embodiment, the resultant data is transmitted up the wireline 120 to the computing apparatus (not shown) aboard the computing rig 125 for recording.

Contrary to conventional marine 3D VSP seismic surveys, the presently disclosed technique employs "continuous" recording of the received reflections. In conventional marine 3D VSP seismic surveying, the shots are well timed and coordinated so that recording can take place only in windows at times during which the reflections are expected to be received. The randomness of the independent simultaneous shooting of sources renders this impracticable. The presently disclosed technique therefore uses a "continuous" recording because it is not well known when the reflections 175 will arrive.

As used herein, "continuous recording" may refer to the recording of seismic data across the time gaps that occur between conventional seismic records. Digital data samples will ordinarily be recorded as received at regular "sample intervals", for example, 4 ms, together with the measurement time of each digital data sample," However, recording is continuous such that samples are recorded whenever they are received since there are no gaps in recording. Conventional shooting, on the other hand, typically records fixed record lengths that vary from 300 ms to 20 seconds, depending on the depth desired in the output image. Conventional shooting typically does not have any overlap of the output records, and there is normally a time gap between adjacent records.

A single, continuous record is as long as many conventional seismic records and thus contains the seismic arrivals generated by the initiation of many seismic sources. A continuous record can be up to many hours or days in length (even in a geologic environment in which seismic records need only be a few seconds). It may, but need not, be carved into numerous shorter records, either contiguous with one another, or overlapping, or even discarding certain time windows from the continuous record.

The recording plan 160 will include the time at which shooting is to begin and when it is expected to end, and so that is the time during which the recording takes place. Each digitized sample is typically recorded at 2 or 4 ms sample intervals as discussed above and the shooting times and locations are recorded for each of the seismic sources until the source boats are finished shooting. And, thus, ends the acquisition of the seismic data.

Once the acquisition is completed, the seismic data is processed for analysis. In theory, this processing could occur in whole or in part aboard the rig 125 or wherever else it is recorded. The recorded data is very voluminous and the processing is very computationally intensive. Few field assets such as the rig 125 and the tow vessels 145 have sufficient computing resources to perform such processing in an acceptable period of time. Accordingly, the recorded reflections—i.e., seismic data—300 are therefore transported to a computing facility 305, shown in FIG. 3.

Figure 3:
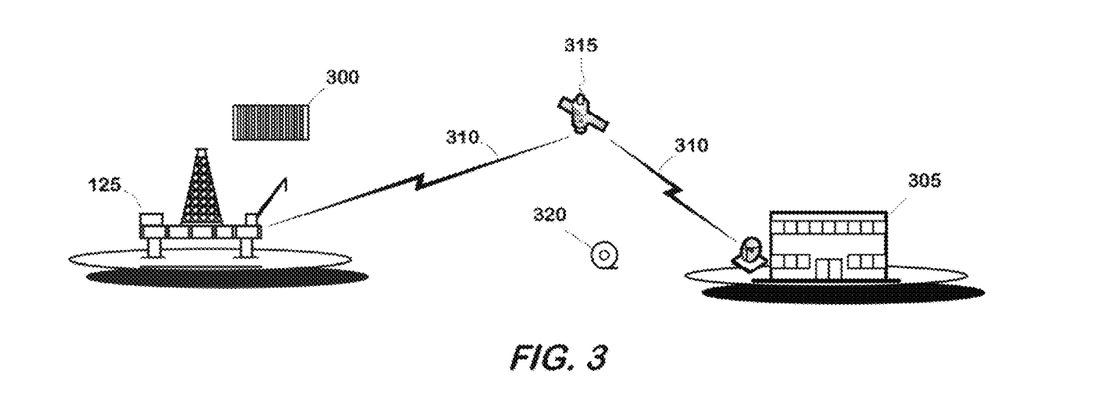
FIG. 3 depicts the transportation of the seismic data from the collection point to the processing point in the illustrated embodiment.

Those in the art will appreciate that the seismic data 300 is a set of ordered, digital data residing in a non-transitory storage medium. The received reflections are converted from the analog form sensed by the receivers into a digital signal that is then recorded. The seismic data 300 is typically preserved on the non-transitory storage medium from which it can then be processed.

The seismic data 300 may be transported to the computing facility 305 in any suitable fashion known to the art. For example, in some embodiments the seismic data 300 can be transmitted over wireless communications links 310 via satellite 315. Other embodiments might encode the seismic data 300 on a magnetic tape 320 or disk and convey it by air or sea and then ground transportation (not shown) the computing facility 305.

Figure 4:
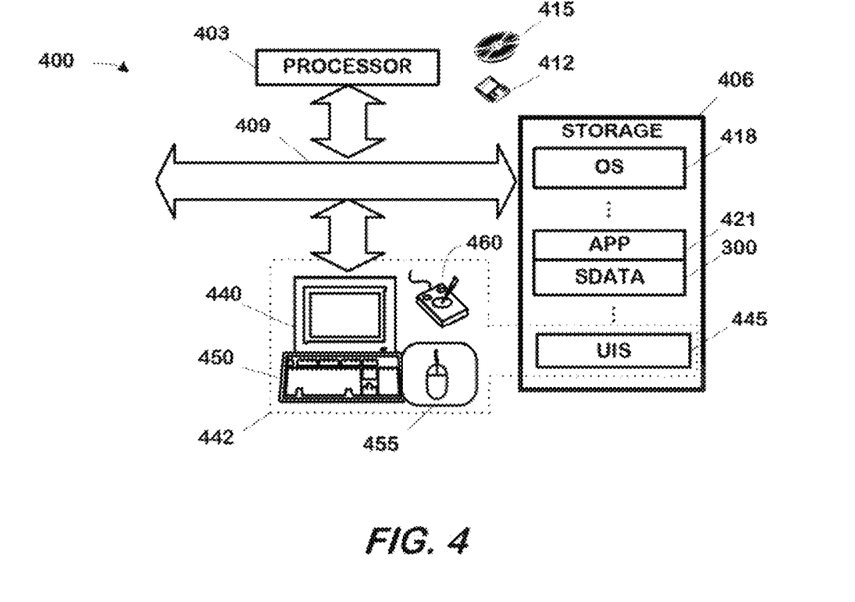
FIG. 4 conceptually depicts selected portions of the hardware and software architecture of a computing apparatus such as may be employed in some aspects of the presently disclosed technique.

The computing facility 305 will house a computing system suitable for the desired processing. FIG 4 conceptually depicts selected portions of the hardware and software architecture of a computing apparatus 400 such as may be employed in some aspects of the present invention. The computing apparatus 400 may be a general purpose computing apparatus or a dedicated computing apparatus depending upon the particular implementation. The computing apparatus 400 includes at least an electronic processor 403 communicating with storage 406 over a communication medium 409.

The electronic processor 403 may be any suitable processor or processor set known to the art. Those in the art will appreciate that some types of processors will be preferred in various embodiments depending on familiar implementation-specific details. Factors such as processing power, speed, cost, and power consumption are commonly encountered in the design process and will be highly implementation specific. Because of their ubiquity in the art, such factors will be easily reconciled by those skilled in the art having the benefit of this disclosure. The electronic processor 403 may theoretically be an electronic micro-controller, an electronic controller, an electronic microprocessor, an electronic processor set, or an appropriately programmed application specific integrated circuit ("ASIC"), field programmable gate array ("FPGA"), or graphical processing units ("GPUs"). Some embodiments may even use some combination of these processor types.

Those in the art will also appreciate that data sets such as the seismic data 110 are quite voluminous and that the processing described herein is computationally intensive. Typical implementations for the electronic processor 403 therefore actually constitute multiple electronic processor sets spread across multiple computing apparatuses working in concert. One such embodiment is discussed below. These considerations affect the implementation of the storage 406 and the communication medium 409 similarly.

The storage 406 may include non-transitory storage media such as a magnetic hard disk and/or random access memory ("RAM") and/or removable storage such as a USB magnetic disk 412 and an optical disk 415. The storage 406 is encoded with a number of software components. These components include an operating system ("OS") 418, an application 421; and data structures including the seismic data ("SDATA") 300. The storage 406 may be distributed across multiple computing apparatuses as described above.

As with the electronic processor 403, implementation-specific design constraints may influence the design of the storage 406 in any particular embodiment. For example, as noted above, the disclosed technique operates on voluminous data sets which will typically mitigate for various types of "mass" storage such as a redundant array of independent disks ("RAID"). Other types of mass storage are known to the art and may also be used in addition to or in lieu of a RAID. As with the electronic processor 403, these kinds of factors are commonplace in the design process and those skilled in the art having the benefit of this disclosure will be able to readily balance them in light of their implementation specific design constraints.

The electronic processor 403 operates under the control of the OS 418 and executes the application 421 over the communication medium 409. This process may be initiated automatically, for example upon startup, or upon user command. User command may be directly through a user interface. To that end, the computing system 400 of the illustrated embodiment also employs a user interface 442.

The user interface 442 includes user interface software ("UIS") 445 and a display 440. It may also include peripheral input/output ("I/O") devices such as a keypad or keyboard 450, a mouse 455, or a joystick 460. These will be implementation-specific details that are not germane to the presently disclosed technique. For example, some embodiments may forego peripheral I/O devices if the display 440 includes a touch screen. Accordingly, the presently disclosed technique admits wide variation in this aspect of the computing system 400 and any conventional implementation known to the art may be used.

Furthermore, there is no requirement that the functionality of the computing system 400 described above be implemented as disclosed. For example, the application 421 may be implemented in some other kind of software component, such as a daemon or utility. The functionality of the application 421 need not be aggregated into a single software component and may be distributed across two or more software components. Similarly, the data structures may be implemented using any suitable data structure known to the art.

As with the electronic processor 403 and the storage 406, the implementation of the communications medium 409 will vary with the implementation. If the computing system 400 is deployed on a single computing apparatus, the communications medium 409 may be, for example, the bus system of that single computing apparatus. Or, if the computing system 400 is implemented across a plurality of networked computing apparatuses, then the communications medium 400 may include a wired or wireless link between the computing apparatuses. Thus, the implementation of the communications medium 409 will be highly dependent on the particular embodiment in ways that will be apparent to those skilled in the art having the benefit of this disclosure.

As is apparent from the description herein, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically after the content of the storage, as will subsequent processing of that data. The physical alteration is a "physical transformation" in that it changes the physical state of the storage for the computing apparatus.

Note also that the software implemented aspects of the invention are typically encoded on some form of program storage medium or, alternatively, implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 5:
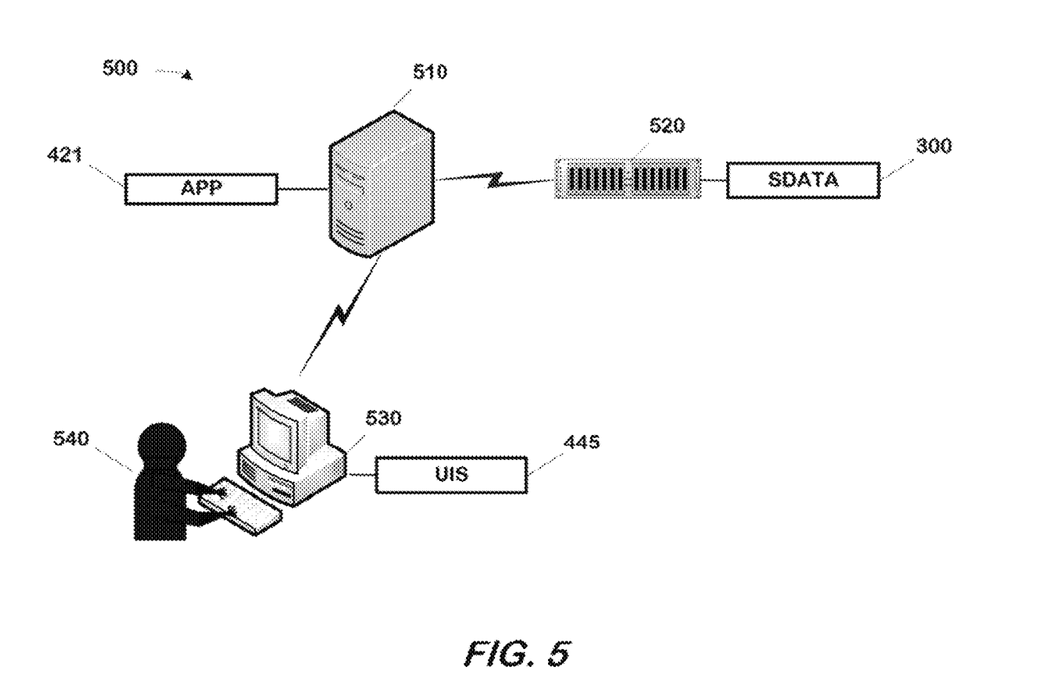
FIG. 5 conceptually depicts selected portions of the hardware and software architecture of one particular computing apparatus used to process the seismic data in the illustrated embodiment.
Figure 6:
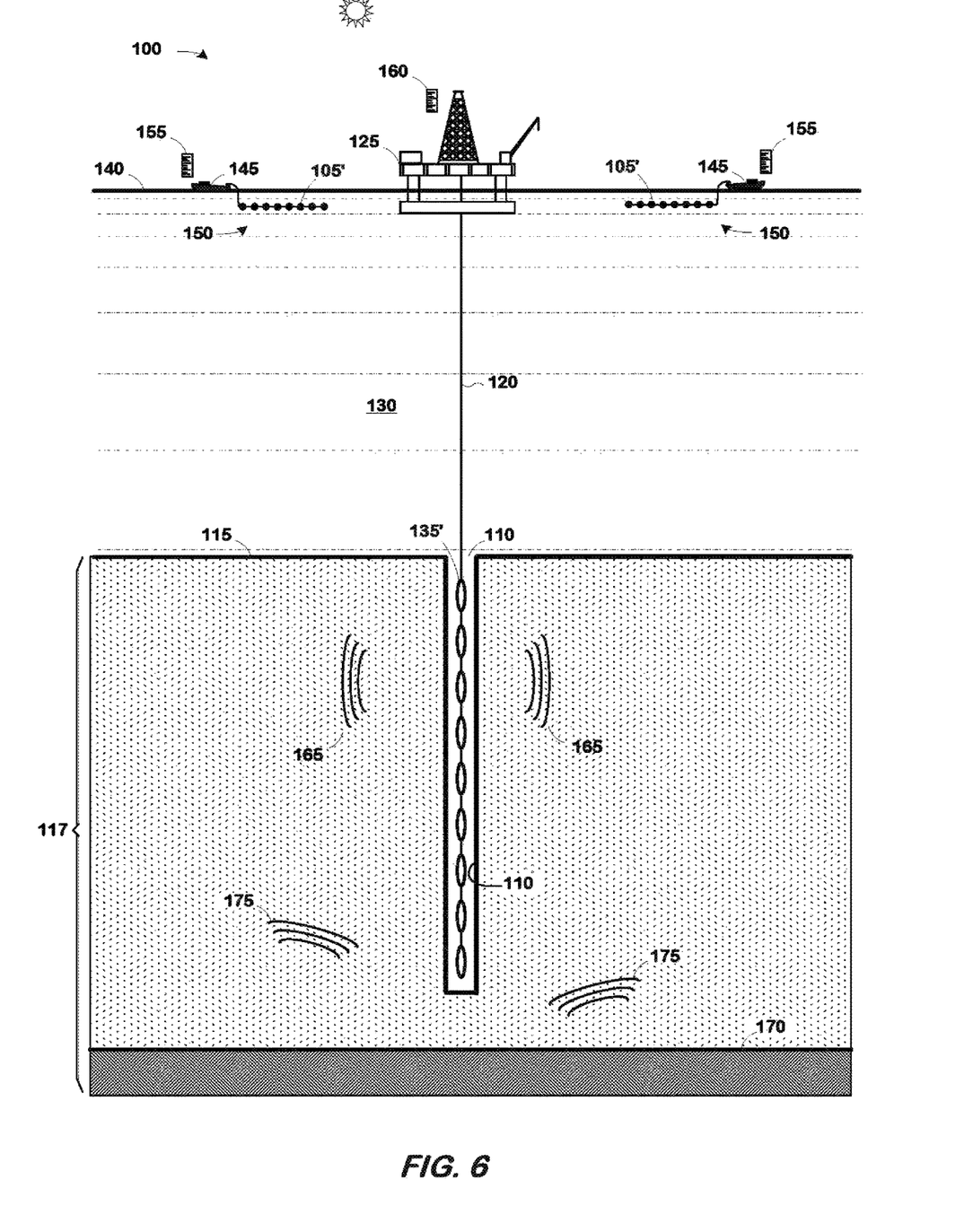
FIG. 6 depicts one particular embodiment of a marine VSP seismic survey alternative to that shown in FIG. 1 in accordance with one aspect of the presently disclosed invention.

A portion of an exemplary computing system 500 by which such processing occurs in the illustrated embodiment is shown in FIG. 5. The computing system 500 is networked, but there is no requirement that the computing system 500 be networked. Alternative embodiments may employ, for instance, a peer-to-peer architecture or some hybrid of a peer-to-peer and client/server architecture. The size and geographic scope of the computing system 500 is not material to the practice of the invention. The size and scope may range anywhere from just a few machines of a Local Area Network ("LAN") located in the same room to many hundreds or thousands of machines globally distributed in an enterprise computing system.

The computing system 500 comprises, in the illustrated portion, a server 510, a mass storage device 520, and a workstation 530. Each of these components may be implemented in their hardware in conventional fashion. Alternative embodiments may also vary in the computing apparatuses used to implement the computing system 500. Those in the art will furthermore appreciate that the computing system 500, and even that portion of it that is shown, will be much more complex. However, such detail is conventional and shall not be shown or discussed to avoid obscuring the subject matter claimed below.

In FIG. 5, the application 421 is shown residing on the server 510 while the seismic data 300 resides in the mass storage 520. While this is one way to locate the various software components, the technique is not dependent upon such an arrangement. Although performance concerns may mitigate for certain locations in particular embodiments, the situs of the software components is otherwise immaterial.

The presently disclosed technique admits some variation in the processing depending on the manner of acquisition and implementation specific goals for the end product. Those in the art will appreciate that there will typically be some degree of preprocessing no matter the processing approach. Such pre-processing will typically be used in various embodiments of the presently disclosed technique. However, due to its ubiquity in the art and the familiarity of those in the art with it, such pre-processing will not be discussed further for the sake of clarity and so as to avoid obscuring the subject matter claimed below.

In the illustrated embodiments, the processing includes at least a technique known as "deblending". Deblending extracts snots from the seismic record and, in some embodiments, is combined with other techniques to mitigate interference arising from other shots. Examples of deblending in accordance with the presently disclosed technique include combing the record, combing and then filtering the record, and a sparse inversion technique known as shot separation by inversion "SSI".

In one particular embodiment, the processing includes what is known to the art as "combing". Although the shooting occurs "randomly" as described above, the times at which the snots are fired is a part of the seismic record because they are known after the fact. This knowledge can then be used to "comb" the seismic record for shots amidst the noise associated with other shots. This technique extracts the shots without any effort at removing interference. Combing results in records from which relatively noisier images can be obtained.

In an alternative embodiment, combing is combined with filtering to remove interference. The combing in this embodiment can be performed as described and a filter is then applied to the combed data. The combed data can then be sorted into gathers in which the interference looks random and the signal looks coherent. For example, some embodiments may employ a receiver gather, although other kinds of gathers may be used. The gathers are then filtered. The filtering may be by application of, for example, Fourier, Radon, Wavelet, Curvelek or Seislet transforms.

The illustrated embodiment, however, uses a third processing technique Because the illustrated embodiment uses the "popcorn" shooting technique disclosed in the '947 application, it is particularly amenable to processing by a sparse inversion technique. This sparse inversion technique, also disclosed in the '947 application, is adapted from known techniques taught in for example, Abma, R. L., et al., "High Quality Separation of Simultaneous Sources by Sparse Inversion", 72nd Annual Conference and Exhibition, EAGE, Extended Abstracts (2010), and U.S. application Ser. No. 12/542,433, modified as taught in the '947 application.

The propagation of seismic waves through a subterranean formation typically creates continuous wavefields. This continuity may be used to constrain the solutions of the conventional approach. Thus, the conventional inversion technique is modified by constraining it with the spatial continuity of the data:

$$d \approx A\ C\ m$$

wherein d is the acquired data, A is the convolution operator, C is the continuity operator, and m is the desired data. The continuity operator C ensures that m is spatially continuous. Multidimensional Fourier transforms may be used with thresholding to calculate a continuity operator.

Alternative embodiments may use other coherency criteria. One such alternative criterion is the curvelet method suggested in Lin, Tim and Herrmann, "Felix, Designing Simultaneous Acquisitions with Compressive Sensing", $71^{st}$ Annual Conference and Exhibition, EAGE, Extended Abstracts (2009). With enough iterations, thresholding the curvelets may produce similar results to those of the method described above, but thresholding in FK space is likely to be more effective and fester than the corresponding curvelet approach. Examples of alternative methods of incorporating the assumption of a coherent wave-field into the inversion would include various Radon transforms and prediction-error filters.

There are several inversion processes known to the art that are suitable for solving for the desired data m. In one particular embodiment, the inversion process is similar to the Prejection Onto Convex Sets ("POCS") interpolation method taught in Abma R. & Kabir, N. "3D interpolation of irregular data with a POCS algorithm". *Geophysics,* 71, E91-E97 (2006) and U.S. application Ser. No. 12/464,907, filed May 13, 2009. Alternative embodiments may employ other techniques. Any suitable solver known to those of skill In the art may be used.

In general, a method of processing data acquired by the disclosed method may include using a Fourier transform method such as a Fast Fourier transform (FFT) to enforce coherency in the model m to be solved for in the inversion for the expression $$d \approx A\ C\ m$$

The desired result m is solved with an iterative method that involves ordering the data d into a common-receiver gather, combing the difference of the data d and the estimated data d', adding this combed difference to the calculated model m, Fourier transforming windows of the model, thresholding the transformed data to remove the weakest events in the Fourier domain, inverse Fourier transforming the windows, merging the windows into the full model m, calculating an estimated data d' from the new model, and repeating the process until an acceptable result m is obtained.

In the case of using Popcorn acquisition, the steps of removing the Popcorn patterns from the acquired data and adding the Popcorn patterns to the calculated model m to get the estimate of the data d' will be added.

The following papers, applications, and patents are hereby incorporated by reference for the purposes stated:

Abma H. & Kabir, N. "3D interpolation of irregular data with a POCS algorithm", *Geophysics,* 71, E91-E97 (2006), for its teachings regarding the Projection Onto Convex Sets ("POCS") interpolation method.

U.S. application Ser. No. 12/310,204, entitled, "Seismic Survey Method", and filed Aug. 30, 2007, in the name of David John Howe ("the '204 application") and commonly assigned herewith, for all that it teaches.

U.S. application Ser. No. 12/464,907, entitled, "Method of Seismic Data Interpolation by Projection on Convex Sets", filed May 13, 2009, in the name of the inventor Raymond L. Abma, published Nov. 26, 2009, as U.S. Patent Publication 20090292476 A1, and commonly assigned herewith, for its teachings regarding the Projection Onto Convex Sets ("POCS") interpolation method.

Lin, Tim and Herrmann, "Felix, Designing Simultaneous Acquisitions with Compressive Sensing", $71^{st}$ Annual Conference and Exhibition, EAGE, Extended Abstracts (2009), for its teachings regarding a curvelet method.

U.S. application Ser. No. 12/542,433, entitled "Method for Separating Independent Simultaneous Sources," and filed Aug. 17, 2009, in the name of the inventor Raymond L. Abma, and commonly assigned herewith, for its teachings regarding a sparse inversion method.

Abma, R. L. et al., "High Quality Separation of Simultaneous Sources by Sparse Inversion, 72nd Annual Conference and Exhibition, EAGE, Extended Abstracts (2010), for its teachings regarding a sparse inversion method.

U.S. application Ser. No. 12/851,590, entitled "Method for Separating Independent Simultaneous Sources," and filed Aug. 6, 2010, in the name of the inventor Raymond L. Abma, and commonly assigned herewith, for its teachings of a sparse inversion process with independent, simultaneous shooting sources.

U.S. application Ser. No. 13/315,947, entitled, "Seismic Acquisition System and Method", and filed Dec. 9, 2011, in the name of Allan Ross and Raymond Lee Abma and commonly assigned herewith, for its teaching regarding popcorn shooting of seismic sources.

U.S. application Ser. No. 13/867,705, entitled "Seismic Survey Method", and filed Apr. 22, 2013, in the name of John David Howe and commonly assigned herewith, for all that it teaches.

In the event of a conflict between any incorporated paper, application, or reference and the present disclosure, the present disclosure controls.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for use in vertical seismic profiling, comprising:
    independently and simultaneously shooting a plurality of seismic sources grouped into a plurality of groups respectively operating in a plurality of different shooting areas to impart seismic signals into a water bottom, wherein seismic sources of each group shoot signals spatially and temporally independent from seismic sources of any other group by performing at least one of the following:
        moving a plurality of boats respectively associated with the plurality of groups at different speeds such that a time interval at which an interference, between the signals shot from the different groups, repeats is random;
        introducing irregular intervals between source points of the seismic sources in each of the groups such that a time interval between the source points of the seismic sources in each of the groups is random; or
        adding a random perturbation to expected arrival times for the seismic signals from each of the groups such that the expected arrival times for the seismic signals from each of the groups are random;
    receiving reflections of the seismic signals from a subterranean formation beneath the water bottom at a plurality of seismic receivers; and
    recording the reflections of the seismic signals to obtain the seismic record;
    wherein, the seismic sources or the seismic receivers are disposed in a wellbore in the water bottom.

2. The method of claim 1, wherein the plurality of shooting areas includes two shooting areas.

3. The method of claim 1, wherein the plurality of seismic sources are configured into arrays.

4. The method of claim 3, wherein independently and simultaneously shooting the plurality of seismic sources comprises shooting with a firing pattern that includes a time delay between two different shooting patterns, wherein seismic sources of a first group of the plurality of groups shoots according to a first shooting pattern of the two different shooting patterns and seismic sources of a second group of the plurality of groups shoots according to a second shooting pattern of the two different shooting patterns.

5. The method of claim 1, wherein independently and simultaneously shooting the plurality of seismic sources comprises:
    firing each seismic source of a first group of the plurality of groups according to a first firing pattern; and
    firing each seismic source of a second group of the plurality of groups according to a second firing pattern, wherein the first firing pattern and the second firing pattern are different.

6. The method of claim 5, wherein a time delay is present between the first firing pattern and the second firing pattern.

7. The method of claim 1, wherein recording the reflections of the seismic signals comprises continuously recording the reflections of the seismic signals.

8. The method of claim 1, further comprising processing the seismic record comprising the reflections of the seismic records by deblending the seismic record to extract shots from the seismic record.

9. The method of claim 8, wherein deblending the seismic record comprises at least one of combing the seismic record for the shots, filtering interference from the seismic record, and performing a sparse inversion on the seismic record.

10. The method of claim 8, wherein deblending the seismic record comprises performing a sparse inversion using a Fourier transform method to enforce coherency in a model to be solved for in the sparse inversion for the expression:

$$d \approx A\ C\ m$$

wherein d is acquired data, A is a convolution operator, C is a continuity operator, and m is desired data.

11. The method of claim 10, wherein solving for m comprises iteratively:
    ordering the acquired data d into a common-receiver gather;
    combing a difference of the acquired data d and a first estimated data d';
    adding the difference of the acquired data d and the first estimated data d' to the calculated model m;
    Fourier transforming windows of the model;
    thresholding the transformed data to remove weakest events in the Fourier domain;
    inverse Fourier transforming the windows;
    merging the windows into the full model m; and
    calculating a second estimated data or from the new model;
    until an acceptable result m is obtained.

12. The method of claim 8, further comprising mitigating interference by filtering the seismic record.

13. The method of claim 12, wherein filtering comprises applying a Fourier, Radon, Wavelet, Curvelet, or Seislet transform.

14. A method for use in vertical seismic profiling, comprising:
    acquiring vertical seismic profiling data, comprising:
        independently and simultaneously shooting a plurality of seismic sources grouped into a plurality of groups operating in a plurality of shooting areas to impart seismic signals into a water bottom, wherein seismic sources of each group shoot signals spatially and temporally independent from seismic sources of any other group by performing at least one of the following:
            moving a plurality of boats respectively associated with the plurality of groups at different speeds such that a time interval at which an interface, between the signals shot from the different groups, repeats is random;
            introducing irregular intervals between source points of the seismic sources in each of the groups such that a time interval between the source points of the seismic sources in each of the groups is random; or adding a random perturbation to expected arrival times for the seismic signals from each of the groups such that the expected arrival times for the seismic signals from each of the groups are random;

receiving reflections of the seismic signals from a subterranean formation beneath the water bottom at a plurality of seismic receivers; and recording the reflections to obtain the seismic record; wherein the seismic sources or the seismic receivers are disposed in a wellbore in the water bottom; and processing the vertical seismic profiling data by deblending the seismic record comprising the reflections of the seismic signals to extract shots from the seismic record.

15. The method of claim 14, wherein the plurality of seismic sources are disposed in a plurality of shooting areas.

16. The method of claim 14, wherein independently and simultaneously shooting the plurality of seismic sources grouped into the plurality of groups includes:

firing each seismic source of a first group as part of a firing pattern; and firing each seismic source of a second group as part of a second firing patter, wherein the first firing pattern and the second firing pattern are different.

17. The method of claim 14 wherein recording the reflections of the seismic signals includes continuously recording the reflections of the seismic signals from the subterranean formation.

18. The method of claim 14, further comprising processing the seismic record comprised of the reflections of the seismic signals by deblending the seismic record to extract the shots from the seismic record.

19. The method of claim 18, wherein deblending the seismic record comprises at least one of combing the seismic record for the shots, filtering interference from the seismic record, and performing a sparse inversion on the seismic record.

* * * * *